(12) United States Patent
Blendea et al.

(10) Patent No.: US 6,616,227 B2
(45) Date of Patent: Sep. 9, 2003

(54) POWERED ACTUATOR FOR LUMBAR UNIT

(75) Inventors: Horia Blendea, Lasalle (CA); Jintao Liu, Windsor (CA); Yang Cao, Windsor (CA); Ed Dornan, Ypsilanti, MI (US); Joseph Benson, South Lyon, MI (US)

(73) Assignee: Schukra North America, Windsor, Ontario (CA)

( * ) Notice: Subject to any disclaimer, the term of this patent is extended or adjusted under 35 U.S.C. 154(b) by 0 days.

(21) Appl. No.: 09/790,003

(22) Filed: Feb. 21, 2001

(65) Prior Publication Data

US 2002/0113471 A1 Aug. 22, 2002

(51) Int. Cl.7 .............................................. A47C 3/025
(52) U.S. Cl. ................................................... 297/284.4
(58) Field of Search ............................ 297/284.1, 284.4

(56) References Cited

U.S. PATENT DOCUMENTS

| 5,050,930 A | * | 9/1991 | Schuster et al. | |
|---|---|---|---|---|
| 5,197,780 A | | 3/1993 | Coughlin | 297/284.7 |
| 5,217,278 A | | 6/1993 | Harrison et al. | 297/284.7 |
| 5,397,164 A | | 3/1995 | Schuster et al. | 297/284.1 |
| 5,449,219 A | | 9/1995 | Hay et al. | 297/284.4 |
| 5,567,011 A | | 10/1996 | Sessini | 297/284.7 |
| 5,609,394 A | | 3/1997 | Ligon, Sr. et al. | 297/284.4 |
| 5,704,687 A | | 1/1998 | Klingler | 297/284.4 |
| 6,045,185 A | * | 4/2000 | Ligon, Sr. et al. | |
| 6,227,617 B1 | * | 5/2001 | von Moller | |

FOREIGN PATENT DOCUMENTS

| EP | 2947472 A1 | 7/1980 |
|---|---|---|
| EP | 0006840 A1 | 9/1980 |
| EP | 0322535 A1 | 5/1989 |

* cited by examiner

Primary Examiner—Milton Nelson, Jr.
(74) Attorney, Agent, or Firm—Husch & Eppenberger, LLC; Grant D. Kang, Esq.; Robert C. Haldiman, Esq.

(57) ABSTRACT

A powered lumbar support device includes a resilient panel having a first flange and a second flange. The panel is biased in a forward direction for providing an arch in a seat back. A lumbar frame extends downwardly from a support element for slideably supporting the resilient panel. An extending member is affixed to the first flange and projects upwardly from the control module, which is retained in position by a compliant spring. The control module includes a drive mechanism for changing the arch in the basket by changing the distance between the first flange and the second flange by extending and retracting the extending member.

26 Claims, 5 Drawing Sheets

POWERED ACTUATOR FOR LUMBAR UNIT

BACKGROUND OF THE INVENTION

The present invention relates to a mechanical lumbar support for a seat back. More specifically, the present invention relates to a mechanical lumbar support intended for use in an automotive seat.

Consumer trends have forced automobile manufacturers to provide ever increasing levels of comfort in the products being offered for sale. This includes providing multiple seat adjustment components such as reclining mechanisms, headrest height and tilt adjusters, and variable lumbar support devices. These components are designed to meet the physical needs of various sizes of seat occupants. However, to meet these needs, these comfort components require a high level of complexity due to the number of moving parts necessary to provide support at various locations. In particular, the variable lumbar support devices presently being used have included cables and pulley devices that are threaded throughout the seat back.

The complexity of lumbar support devices of the present art consume a significant amount of packaging space and add a considerable amount of mass to the seat. One such device is disclosed in U.S. Pat. No. 5,567,011 to Sessini. Sessini discloses a lumbar support device that requires a cord be threaded through a seat back and routed with a series of pulleys for both adjusting the height and the magnitude of the lumbar support. While devices such as this fulfill comfort expectations, they are costly to produce and difficult to assemble. Further, this type of device requires that a seat back have considerable thickness to enclose all of the lumbar adjustment components.

Therefore, it would be desirable to design an adjustable lumbar support device that meets the needs of various sizes of seat occupants and yet does not adversely affect mass, cost, or packaging space of the vehicle.

SUMMARY OF THE INVENTION AND ADVANTAGES

This invention relates to a powered lumbar support device intended for use in an automobile seat back. The device includes a resilient panel that has an upper flange and a lower flange and is biased in a forward direction for providing an arch in the seat back. A lumbar frame secures the support device to the seat back. A control module affixed to the lumbar frame. An extending member projects from the control module and affixes to the upper flange. The control module includes a drive mechanism capable of changing the distance between the upper flange and the lower flange by extending and retracting the extending member. By changing the distance between the first flange and the second flange, the arch in the resilient sheet can be changed for adjusting the amount of lumbar support. The control module is secured by a compliant spring to the lumbar frame, but otherwise is slidable on the lumbar frame in a vertical direction.

The compliant spring includes a contracting spring force that is greater than the extending force generated by the drive mechanism. Therefore, the compliant spring will prevent the control module from sliding upon the lumbar frame. However, when the resilient panel is subjected to enough force to overcome the contracting spring force, the compliant spring stretches increasing the distance between the first flange and the second flange changing the arch in the resilient panel. The compliance provided to the resilient panel by the resilient spring provides an additional level of comfort to the seat occupant not otherwise available in a rigid lumbar support device.

The control module is powered by a small electric motor eliminating the need for cable and pulley devices for changing the amount and the location of the lumbar support in the seat back. Further, the control device is packaged into a compact lumbar support module that is easily installed into a seat back frame without having to route cables. Due to the compact nature of the control module, lumbar support can be provided in seat backs that are much thinner than those currently in use. Still further, the modules are much less expensive to produce than the current cable and pulley style devices. The low cost provides the ability to install lumbar support devices into economically priced automobiles.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
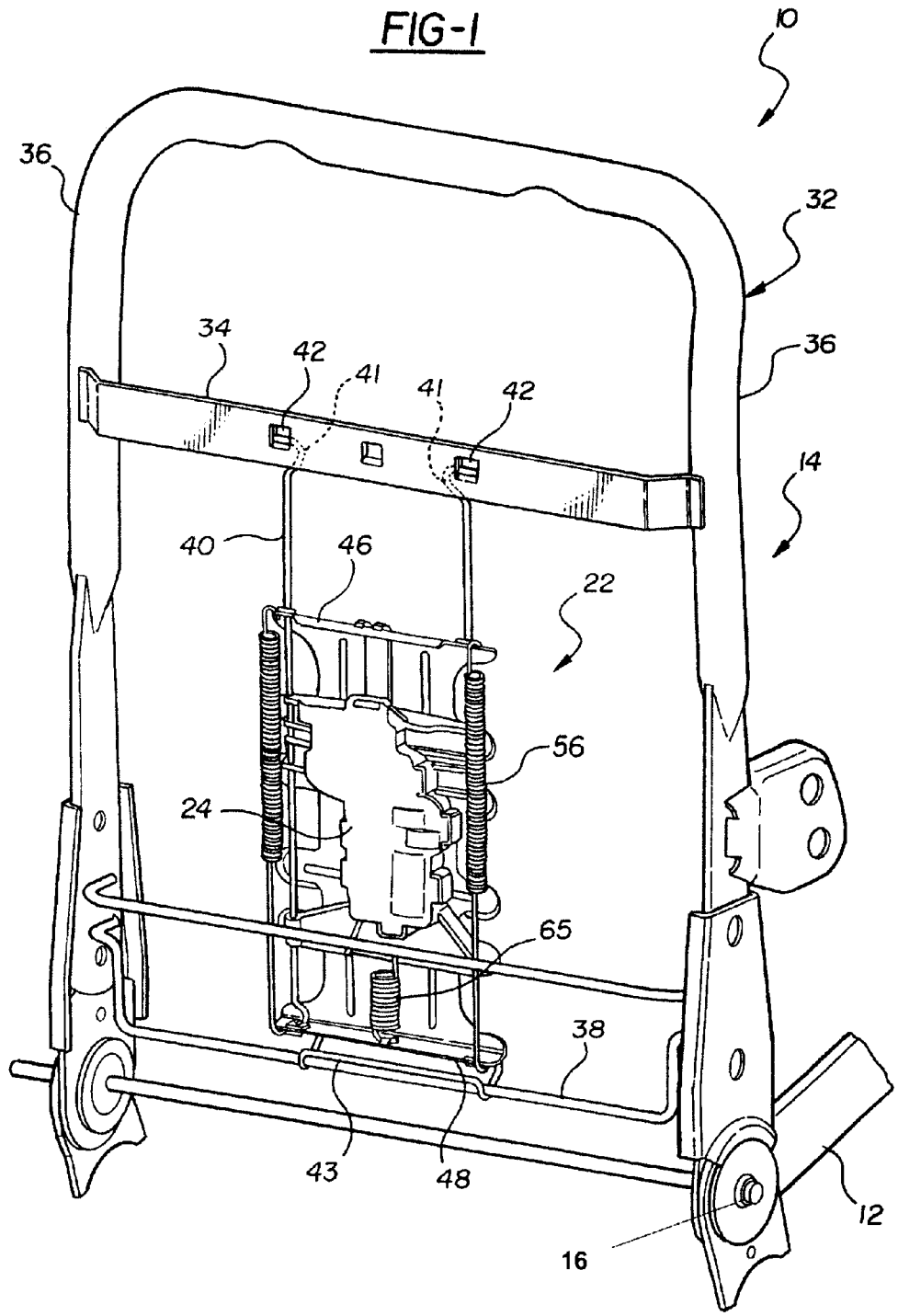
FIG. 1 is a perspective cut away view, showing a seat frame incorporating the lumbar support device with the basket in the arched position.
Figure 2:
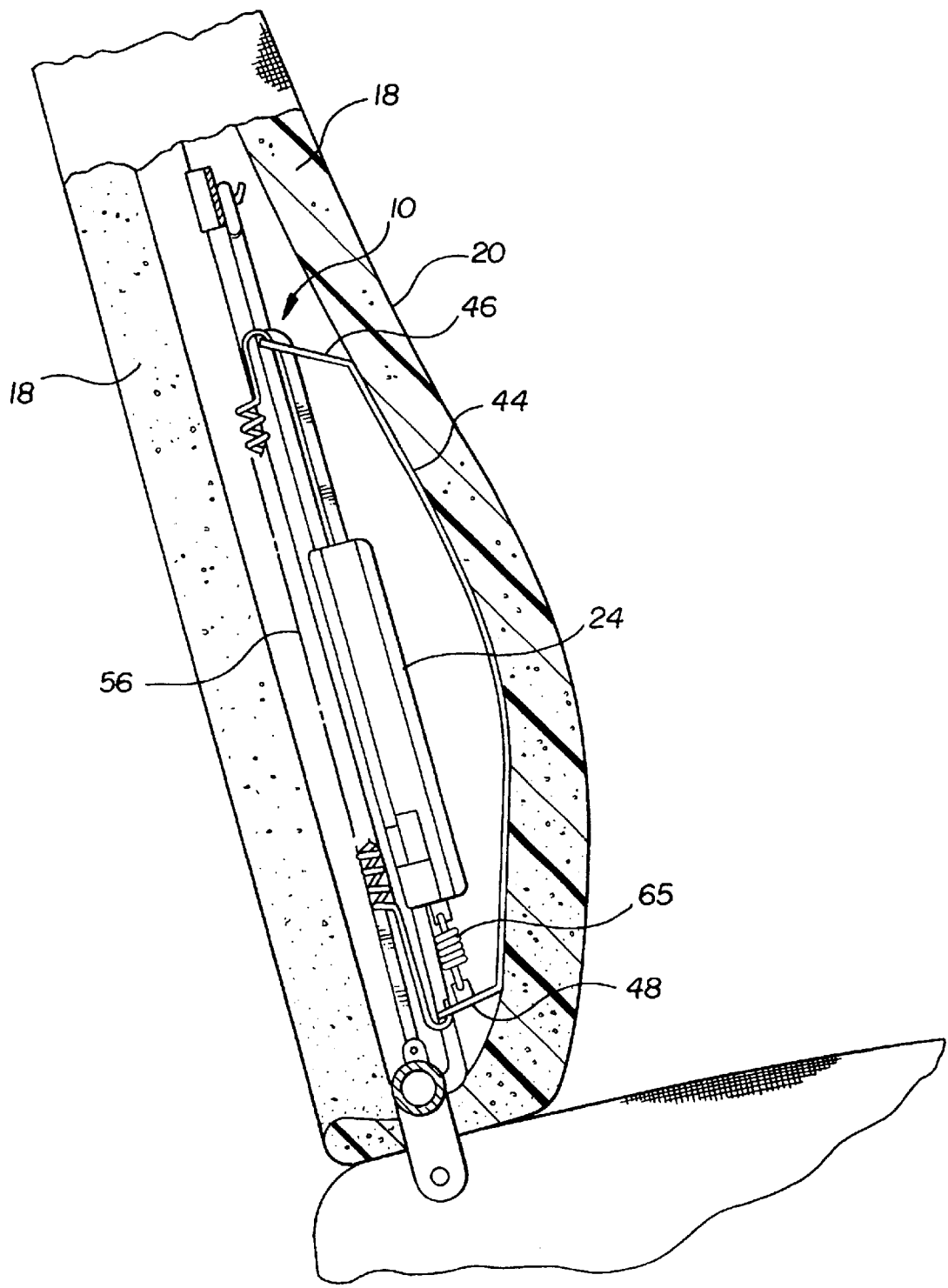
FIG. 2 is a environmental cut away side view, showing a seat with foam and padding, incorporating the lumbar support device with the control module.

Referring to the FIG. 1, an automotive seat frame is generally shown at 10. The frame 10 includes a seat section 12 and back section 14. A reclining mechanism 16 pivotally connects the seat section 12 to the back section 14 and allows the back section 14 to be adjustably fixed into any angular orientation with respect to the seat section 12. FIG. 2 shows the frame 10 concealed by a foam barrier 18 covered with fabric 20 as is known in the art of automotive seating.

A power lumbar device, generally shown in FIG. 1 at 22, provides adjustable back support in the fore/aft direction of the automobile (not shown). The lumbar device 22 includes a control module 24 that adjusts the lumbar device 22 in the fore/aft direction.

The back section 14 of the frame 10 includes a structural ring 32 that defines the perimeter of the back section 14 as is known in the art of automotive seat construction. A support element 34 extends between vertical appendages 36 of the structural ring 32. A cross member 38 also extends between the vertical appendage 36 and is positioned beneath the support element 34. A lumbar frame 40 extends downwardly from the support element 34 and affixes to the cross member 38.

The lumbar frame 40 comprises a single wire that is generally U-shaped and supports the entirety of the lumbar device 22. A pair of hooks 41 engages tabs 42 protruding from the support element 34. A clasp 43 is formed in a lower section of the lumbar frame 40 and clasps the cross member 38. The lumbar device 22 is easily delivered as a completed module and is easily installed into the seat frame 10 by simply clasping the cross member 38 with the clasp 43 and flexing the hooks 41 to engage the tabs 42.

The lumbar device 22 includes a basket comprising a resilient panel 44 arched in the fore direction. The resilient panel 44 includes an first flange 46 and a second flange 48. The first flange 46 includes a first upper notch 50 and a second upper notch 52. The lower flange 48 includes a first lower notch 50' that aligns with the first upper notch 50 and a second lower notch 52' that aligns with the second upper notch 52. The lumbar frame 40 slideably engages the upper notches 50, 52. The lumbar frame 40 includes a pair of protuberances 53 that engage the lower notches 50', 52' preventing the second flange 48 from sliding upon the lumbar frame 40. Each notch 50, 50', 52, 52' includes an insert 51 that engages the lumbar frame 40 providing reliable retention.

The resilient panel 44 includes vertically oriented ribs 54 for stiffening the panel 44. Because the panel 44 is biased in the fore direction, the control module 24 need only apply minimal amounts of force to increase the arch in the fore direction to provide increased lumbar support to the seat occupant.

Figure 3:
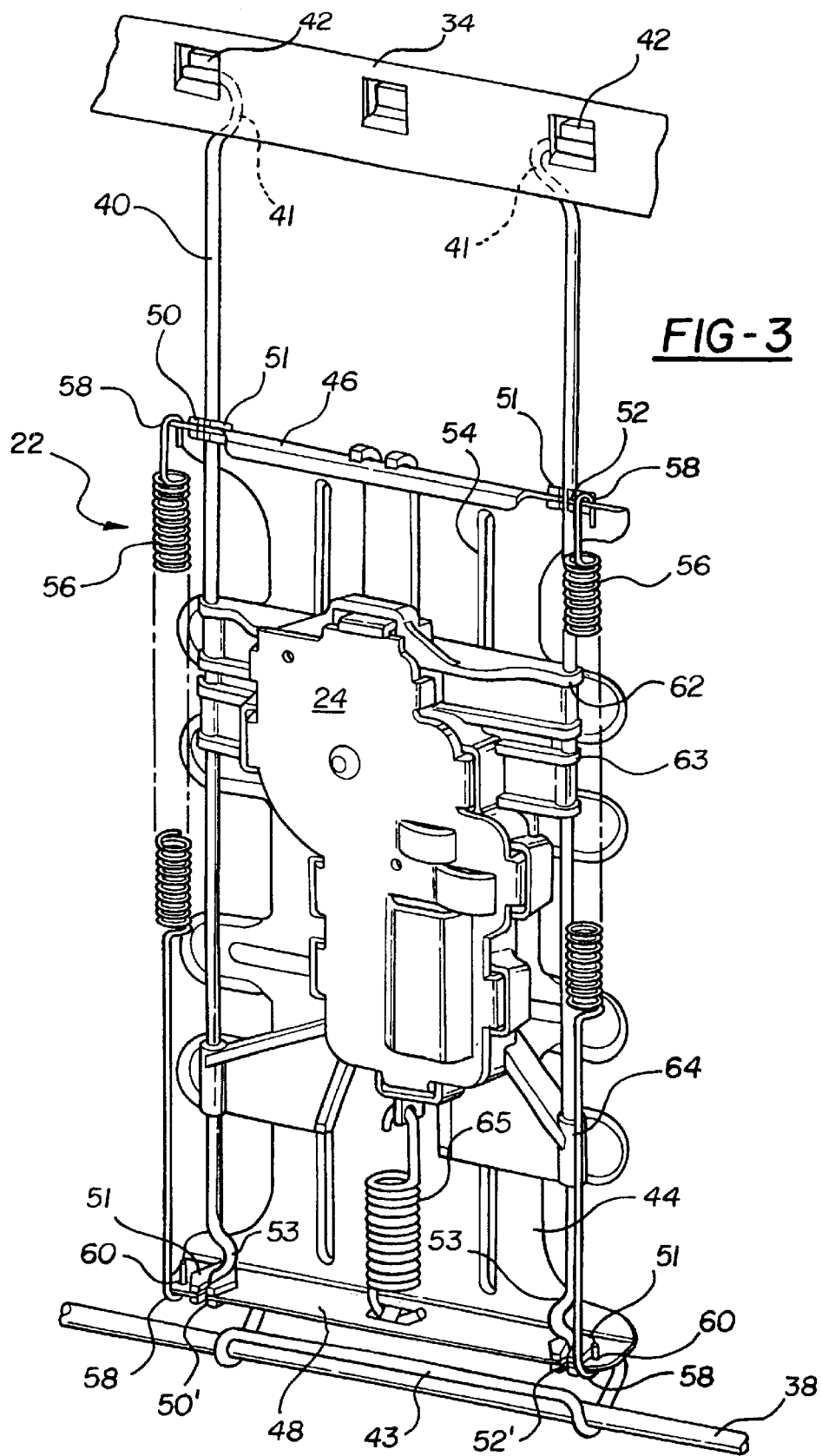
FIG. 3 is a schematic front view of the lumbar support device.
Figure 4:
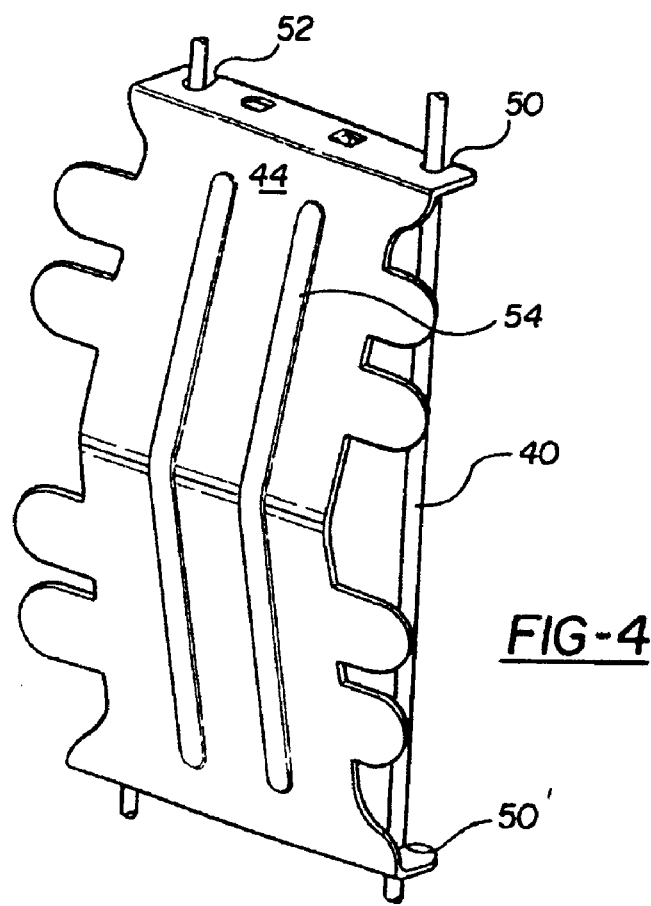
FIG. 4 is a schematic front view of a prebent basket mounted to the lumbar frame.

Expansion springs 56 are shown in FIGS. 1, 2, and 3 positioned on opposite sides of the module 24 and connect to the first and second flanges 46, 48 of the resilient panel 44. The expansion springs 56 have hooks 58 disposed at each end that engage an aperture 60 positioned at the outer ends of the upper and lower flanges 46, 48. The springs 56 provide a contracting force to the resilient panel 44 further biasing the panel. The springs 56 reduce the force required from the first control module 24 to flex the resilient panel 44 in the fore direction. The number of expansion spring connected to the resilient panel 44 can vary to meet different force requirements.

Figure 5:
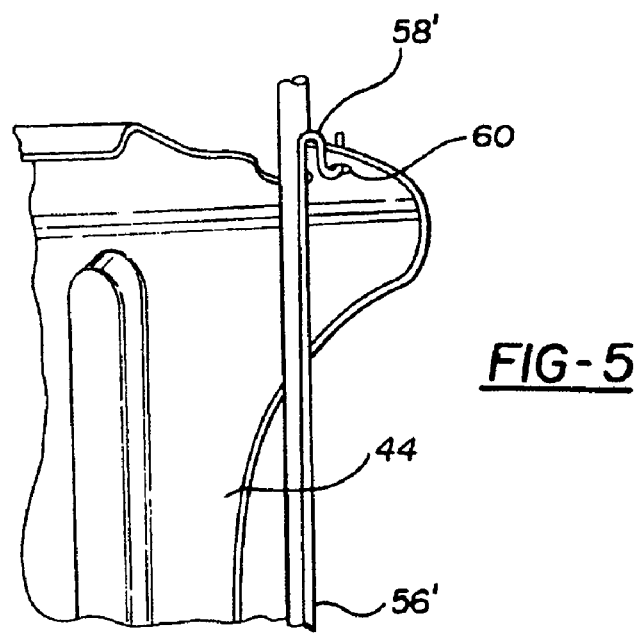
FIG. 5, is an expanded perspective view of the compression spring engaging the resilient panel.

Alternatively, as shown in FIG. 5, a compression spring 56' can be utilized to counter the biasing of the basket. In this case, the springs 56' include reverse hooks 58' disposed at each end. The reverse hooks 58' engage the apertures 60 in an opposite manner as the hooks 58 allowing the compression spring 56' to engage the resilient panel 44 in a way necessary to counter the biasing of the resilient panel 44.

As best represented in FIGS. 1 and 3, the control module 24 is slideably connected to the lumbar frame 40 by at least one backing plate 62, 63, 64. Preferably, an upper backing plate 62, a middle backing plate 63, and a lower backing plate 64 are each connected to the control module 24 and slideably engage the lumbar frame 40. However, other configurations and numbers of backing plates would be equally effective. A compliant spring 65 affixes the control module 24 to the second flange 48 preventing the control module 24 from sliding upon the lumbar frame 40 unless the contracting spring force of the compliant spring 65 is overcome as will be explained further below.

Figure 6:
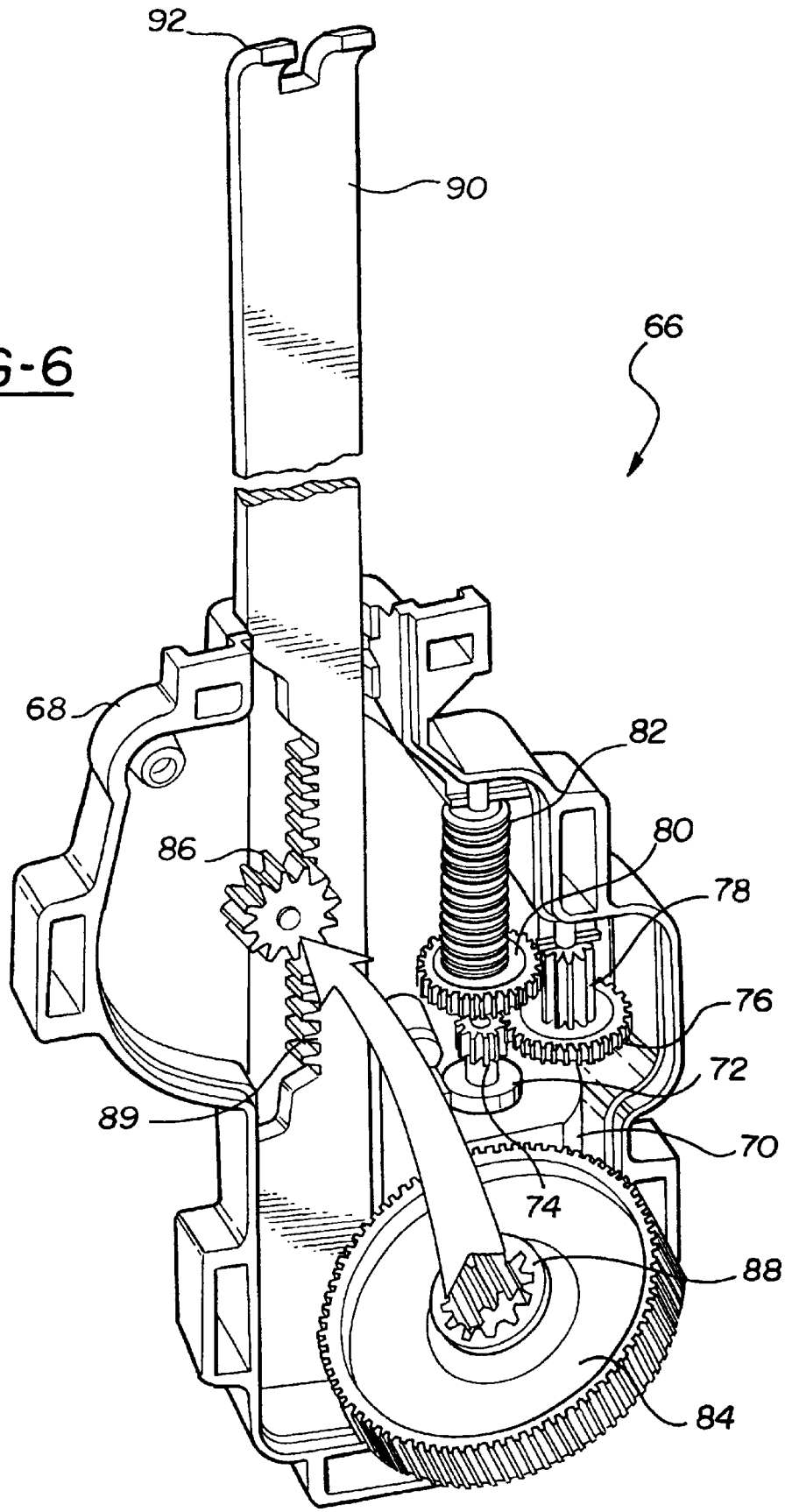
FIG. 6 is a front view of the first control module showing the electric motor and associated gears.

The module 24 includes a drive mechanism, which is shown generally at 66 in FIG. 6. The mechanism 66 includes an electric motor 70 fully enclosed in a housing 68. The motor 70 includes a drive shaft 72 having a drive gear 74 disposed at the end thereof The drive gear 74 is in running engagement with a first spur gear 76. The first spur gear 76 is affixed to a second spur gear 78 having a narrower diameter than that of the first spur gear 76. The first and second spur gears 76, 78 are oriented to pivot upon the same axis. The second spur gear 78 is in running engagement with a third spur gear 80. The third spur gear 80 is affixed to a worm 82. The third spur gear 80 and the worm 82 are oriented to pivot upon the same axis. The worm 82 drives a worm gear 84, which in turn drives a pinion 86. The pinion 86 engages teeth 88 disposed upon the worm gear 84 that point towards the rotational axis of the worm gear 84. Therefore, the worm gear 84 and the pinion 86 are oriented to pivot on the same axis. The pinion 86 is wider than the worm gear 84 so that it can translate rotational movement from the worn gear 84 to a rack 89 by engaging the rack 89. The pinion 86 drives the rack 89 in a linear direction as is known in the art of rack and pinion drives. The motor 70 drives the rack 89 outwardly from the module 24 when running in a first direction. When the motor 70 runs in a second direction, the direction of movement of the rack 89 is reversed thereby being retracted into the module 24. The rack 89 is formed into a first extending member 90. The extending member 90 projects from the control module 24. A talon 92 engages a slot (not shown) in the first flange 46 enabling downward directing force to be applied to the first flange 46.

As indicated above, the first control module 24 is affixed to the second flange 48 of the resilient panel 44 by the compliant spring 65. By driving the first extending member 90 outward from the control module 24 the distance between the first flange 46 and the second flange 48 is increased thereby decreasing the arch of the resilient panel 44. This reduces the amount of lumbar support to the seat occupant. Retracting the extending member 90 into the control module 24 reduces the distance between the first flange 46 and the second flange 48 thereby increasing the arch in the panel 44 in the fore direction. Movement in the fore direction increases the amount of lumbar support to the seat occupant.

The force generated by the motor 70 is not capable of overcoming the contracting spring force of the compliant spring 65. However, the combination of forces generated by the spring 56 and the motor 70 provide enough counter force to the compliant spring 65 to overcome the contracting spring force of the compliant spring 65 when a predetermined force is exerted upon the resilient panel 44 by a seat occupant. This provides the panel 44 with a compliant feature that increase the level of comfort to the seat occupant by softening the lumbar support provided by the resilient panel 44.

The invention has been described in an illustrative manner, and it is to be understood that the terminology that has been used is intended to be in the nature of words of description rather than of limitation.

Many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A powered lumbar support device for a seat comprising:
   a resilient panel having a first flange and a second flange and being biased in a forward direction to provide an arch to a seat back;
   a control module being translatable relative to said flanges and having an extending member projecting therefrom being affixed to one of said flanges; and
   said control module including a drive mechanism capable of changing the distance between said first flange and said second flange by extending and retracting said extending member thereby changing the arch in said seat back resilient panel.

2. A lumbar support device as set forth in claim 1 wherein said drive mechanism includes ribbing stiffening said resilient panel.

3. A lumbar support device as set forth in claim 1 wherein said drive mechanism includes a rack and a pinion, said rack being formed into said extending member.

4. A lumbar support device as set forth in claim 3 wherein said drive mechanism includes a worm gear for driving said opinion.

5. A lumbar support device as set forth in claim 4 wherein said drive mechanism includes an electric motor for driving said worm gear.

6. A lumbar support device as set forth in claim 1 wherein one of said first flange or said second flange is fixedly attached to a lumbar frame.

7. A lumbar support device as set forth in claim 6 wherein said first flange is slideably attached to said lumbar frame.

8. A powered lumbar support device for a seat comprising:
   a resilient panel having a first flange and a second flange and being biased in a forward direction to provide an arch to a seat back;
   a control module moveable relative to said flanges and having an extending member projecting therefrom being affixed to one of said flanges;
   said control module including a drive mechanism capable of changing the distance between said first flange and said second flange by extending and retracting said extending member thereby changing the arch in said seat back; and
   a compliant spring anchored to a seat and having a contraction force greater then an extending force of said drive mechanism.

9. A lumbar support device as set forth in claim 8 wherein said compliant spring expands increasing the distance between said first flange and said second flange when subjected to a force greater than the contraction force thereby reducing the arch in the seat back.

10. A lumbar support device asset forth in claim 9 including at least one backing plate affixed to said control module slideably attaching said control module to a lumbar frame.

11. A lumbar support device as set forth in claim 10 wherein said lumbar frame is received by said flanges such that said lumbar frame affixes said lumbar support device to a seat back.

12. A lumbar support device as set forth in claim 8, including at least one expansion spring stretched between said first flange and said second flange providing biasing force to said resilient panel.

13. A lumbar support device as set forth in claim 8 including at least one compression spring compressed between said first flange and said second flange for countering the bias of said resilient panel.

14. A seat having a powered lumbar support device comprising:
   a seat;
   a back section of said seat having a ring defining a perimeter of said back section;
   a resilient panel disposed within said ring, said resilient panel having a first flange and a second flange and being biased in a forward direction to provide an arch in said back section;
   a support element attached to said ring and having guide rods extending downward therefrom that slideably supports said resilient panel;
   a control module being translatable relative to said flanges and having an extending member projecting therefrom being affixed to one of said flanges; and
   said control module including a drive mechanism capable of changing the distance between said first flange and said second flange by extending and retracting said extending member thereby changing said arch in said back section.

15. A seat having a powered lumbar support device as set forth in claim 14 wherein said resilient panel includes ribbing stiffening said resilient panel.

16. A seat having a powered lumbar support device as set forth in claim 15 wherein said drive mechanism includes a rack and a pinion, said rack being formed into said extending member.

17. A seat having a powered lumbar support device as set forth in claim 16 wherein said drive mechanism includes a worm gear to drive said pinion.

18. A seat having a powered lumbar support device as set forth in claim 17 wherein said drive mechanism includes an electric motor for driving said worm gear.

19. A seat having a powered lumbar support device as set forth in claim 18 wherein said second flange is fixedly attached to said guide rods.

20. A seat having a powered lumbar support device as set forth in claim 19 wherein said first flange is slideably attached to a lumbar frame.

21. A seat having a powered lumbar support comprising:
   a seat;
   a back section of said seat having a ring defining the perimeter of said back section;
   a resilient panel disposed within said ring, said resilient panel having a first flange and a second flange and being biased in a forward direction to provide an arch in said back section;

a support element attached to said ring and having guide rods extending downward therefrom that slideably supports said resilient panel;

a control module moveable relative to said flanges and having an extending member projecting therefrom being affixed to one of said flanges;

said control module including a drive mechanism capable of changing the distance between said first flange and said second by extending and retracting said extending member thereby changing said arch in said back section; and a compliant spring anchored to said seat and having a contraction force greater than an extending force of said drive mechanism.

22. A seat having a powered lumbar support device as set forth in claim 21 wherein said compliant spring expands increasing the distance between said-first flange and said second flange when subjected to a force greater than a contraction force of said spring, thereby reducing said arch in said back section.

23. A seat having a powered lumbar support device as set forth in claim 22 including at least one backing plate affixed to said control module slideably attaching said control module to said guide rods.

24. A seat having a powered lumbar support device as set forth in claim 23 wherein said guide rods are received by said flanges such that said powered lumbar support device is affixed to said ring of said back section.

25. A seat having a powered lumbar support device as set forth in claim 21 including at least one expansion spring stretched between said first flange and said second flange providing a biasing force to said resilient panel.

26. A seat having a powered lumbar support device as set forth in claim 21 including at least one compression spring compressed between said first flange and said second flange for countering the bias of said resilient panel.

* * * * *

UNITED STATES PATENT AND TRADEMARK OFFICE
CERTIFICATE OF CORRECTION

PATENT NO. : 6,616,227 B2
DATED : September 9, 2003
INVENTOR(S) : Blendea et al.

It is certified that error appears in the above-identified patent and that said Letters Patent is hereby corrected as shown below:

Column 5,
Line 24, delete "resilient panel"
Line 25, delete "drive mechanism" and insert -- resilient panel --
Line 62, insert space between "asset" to read -- as set --

Column 7,
Line 9, insert -- flange -- between "second by" to read -- said second flange by… --

Signed and Sealed this

Third Day of August, 2004

JON W. DUDAS
*Acting Director of the United States Patent and Trademark Office*